United States Patent
Vallance

(10) Patent No.: US 7,083,370 B2
(45) Date of Patent: Aug. 1, 2006

(54) FASTENING DEVICES

(75) Inventor: William Ernest Taylor Vallance, Buckinghamshire (GB)

(73) Assignee: Titus International PLC, Buckinghamshire (GB)

( * ) Notice: Subject to any disclaimer, the term of this patent is extended or adjusted under 35 U.S.C. 154(b) by 167 days.

(21) Appl. No.: 10/320,038

(22) Filed: Dec. 16, 2002

(65) Prior Publication Data

US 2005/0002750 A1 Jan. 6, 2005

(30) Foreign Application Priority Data

Dec. 18, 2001 (GB) .................. 0130238.9

(51) Int. Cl.
F16B 13/06 (2006.01)
F16B 13/08 (2006.01)
F16B 13/10 (2006.01)

(52) U.S. Cl. ........................................ 411/45
(58) Field of Classification Search ............ 411/71–74, 411/44–48, 37–38, 54.1, 57.1, 59, 80.1
See application file for complete search history.

(56) References Cited

U.S. PATENT DOCUMENTS

| | | | | |
|---|---|---|---|---|
| 1,102,937 A * | 7/1914 | Malaby | .................. | 72/391.8 |
| 2,148,977 A * | 2/1939 | Buck | ........................ | 411/38 |
| 3,192,820 A * | 7/1965 | Pitzer | ....................... | 411/33 |
| 3,750,519 A * | 8/1973 | Lerich | ...................... | 411/59 |
| 3,837,208 A * | 9/1974 | Davis et al. | ............. | 72/370.07 |
| 4,289,060 A * | 9/1981 | Emmett | .................... | 411/34 |
| 4,309,137 A * | 1/1982 | Tanaka et al. | ............... | 411/45 |
| 4,375,342 A * | 3/1983 | Wollar et al. | ................ | 411/41 |
| 4,437,804 A * | 3/1984 | Fischer | ...................... | 411/59 |
| 4,485,847 A * | 12/1984 | Wentzell | ..................... | 138/89 |
| 4,494,347 A * | 1/1985 | Uhlig | .......................... | 52/508 |
| 4,519,735 A * | 5/1985 | Machtle | ...................... | 411/65 |
| 4,560,311 A * | 12/1985 | Herb et al. | ................... | 411/44 |
| 4,615,554 A * | 10/1986 | Schilla et al. | ................ | 294/89 |
| 4,636,122 A * | 1/1987 | Rooney | ..................... | 411/45 |
| 4,656,806 A * | 4/1987 | Leibhard et al. | ............. | 52/704 |
| 4,678,383 A * | 7/1987 | Bergner | ..................... | 411/32 |
| 4,810,141 A * | 3/1989 | Rainville | .................... | 411/38 |
| 4,821,381 A * | 4/1989 | Kaneko et al. | ............... | 24/297 |
| 4,830,556 A * | 5/1989 | Nelson | ....................... | 411/41 |
| 4,898,505 A * | 2/1990 | Froehlich | .................... | 411/55 |
| 5,531,551 A * | 7/1996 | Bowers | ...................... | 411/70 |
| 5,567,097 A * | 10/1996 | Morin | ........................ | 411/34 |
| 5,749,200 A * | 5/1998 | Fukuoka | ................... | 52/741.1 |
| 6,048,149 A * | 4/2000 | Garcia | ........................ | 411/55 |
| 6,179,536 B1 * | 1/2001 | Belz et al. | ................. | 411/54.1 |
| 6,213,697 B1 * | 4/2001 | Uejima | ....................... | 411/30 |
| 6,454,503 B1 * | 9/2002 | Polic et al. | ................... | 411/45 |
| 6,514,024 B1 * | 2/2003 | Akema et al. | ................ | 411/48 |
| 2002/0076298 A1 * | 6/2002 | Gauthier | .................... | 411/57.1 |

* cited by examiner

Primary Examiner—Robert J. Sandy
Assistant Examiner—Jeffrey A. Sharp
(74) Attorney, Agent, or Firm—Tarolli, Sundheim, Covell & Tummino L.L.P.

(57) ABSTRACT

A device for fastening panels to tubular frames comprises a dowel element (10) and a sleeve element (11). An expander region (15) of the dowel element, comprising a plain cylindrical section (16) and a conically tapering section (17), is designed to react with a complementarily-tapering inner bore section (19) of the sleeve element when the dowel element is moved axially relative to the sleeve element to cause outward movement of an expandable section (20) of the sleeve element. The sleeve element has a flange (21) which acts as a depth stop and an undercut portion (22) so that a shoulder (23) of the expandable section lodges behind the hole in the tubular member when the fastener is set.

9 Claims, 3 Drawing Sheets

FASTENING DEVICES

This invention relates to fastening devices and in particular, though not exclusively, to devices for use in the furniture industry.

The invention provides a fastening device for joining two members together, comprising an elongate dowel element and a sleeve element extending at least partly therearound, with the sleeve element having an expandable portion at or adjacent a first end thereof and the dowel element having an expander region, the expander region being engagable with the expandable portion when the dowel element is moved longitudinally relative to the sleeve element in a first direction to cause lateral outward movement of said expandable portion, the expander region and expandable portion being configured to cause different amounts of lateral outward movement of the expandable portion over its length, with more movement being caused at a position further in said first direction from said first end of the sleeve element than at a position nearer said first end.

Figure 1:
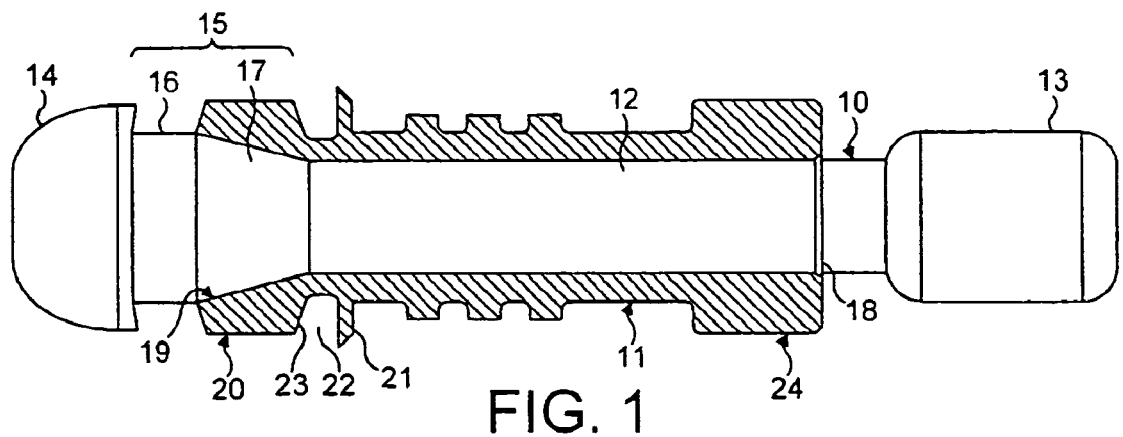
Figure 2:
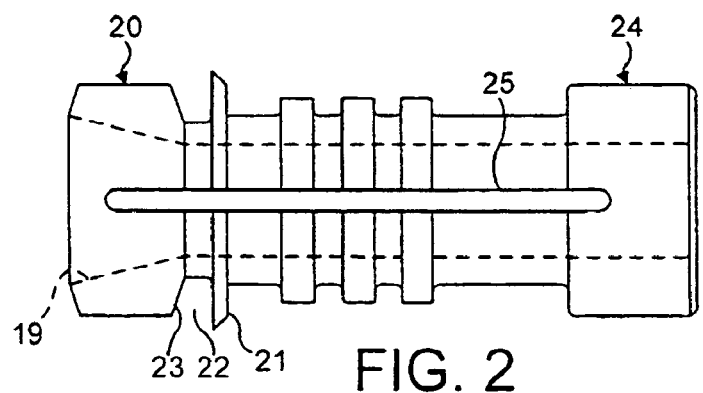
Figure 4:
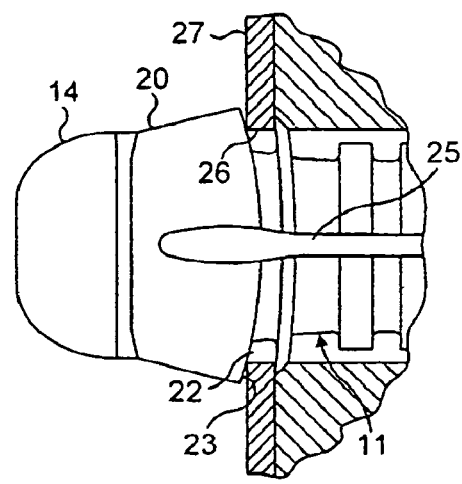
Figure 3A:
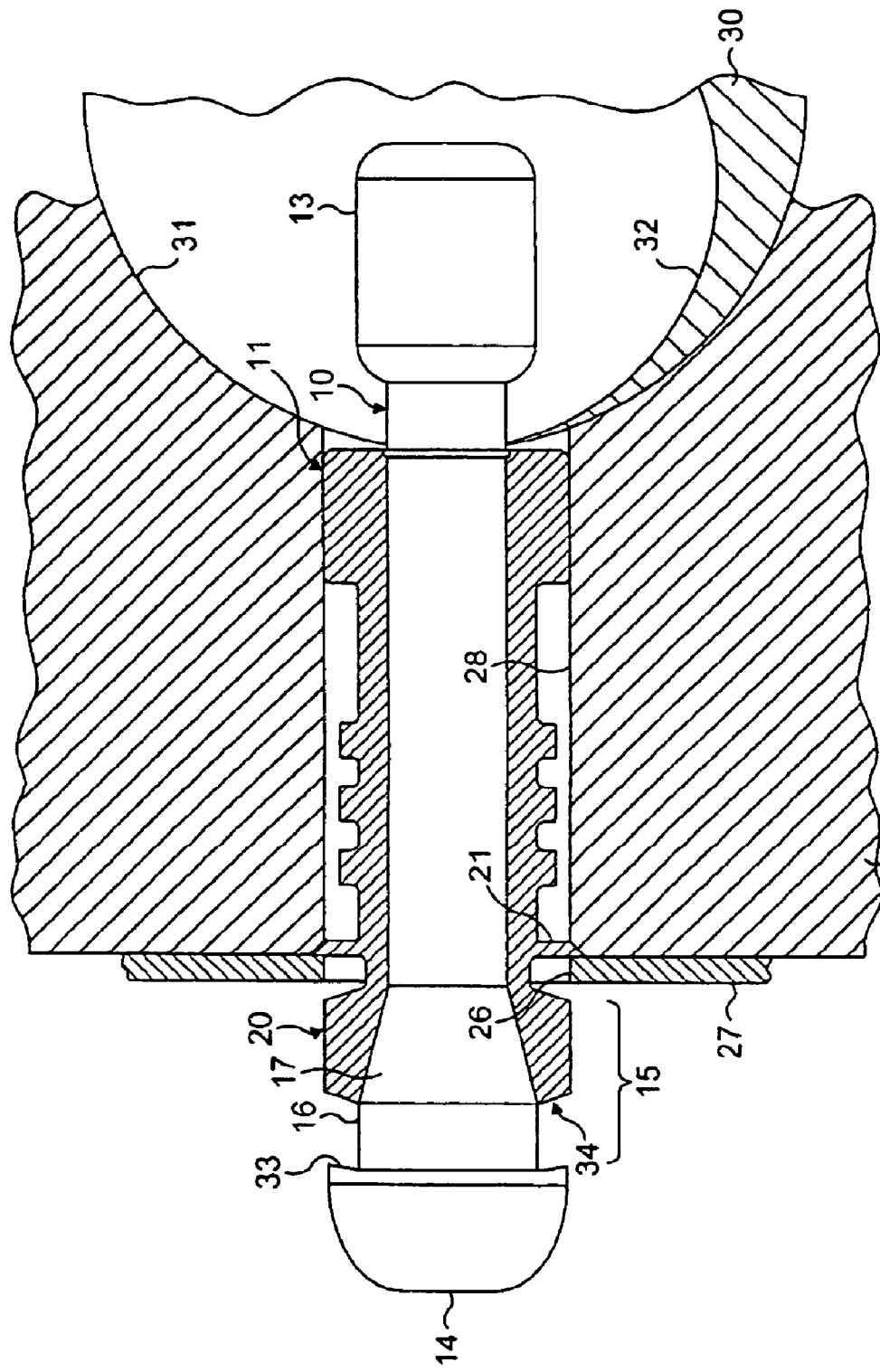
Figure 3B:
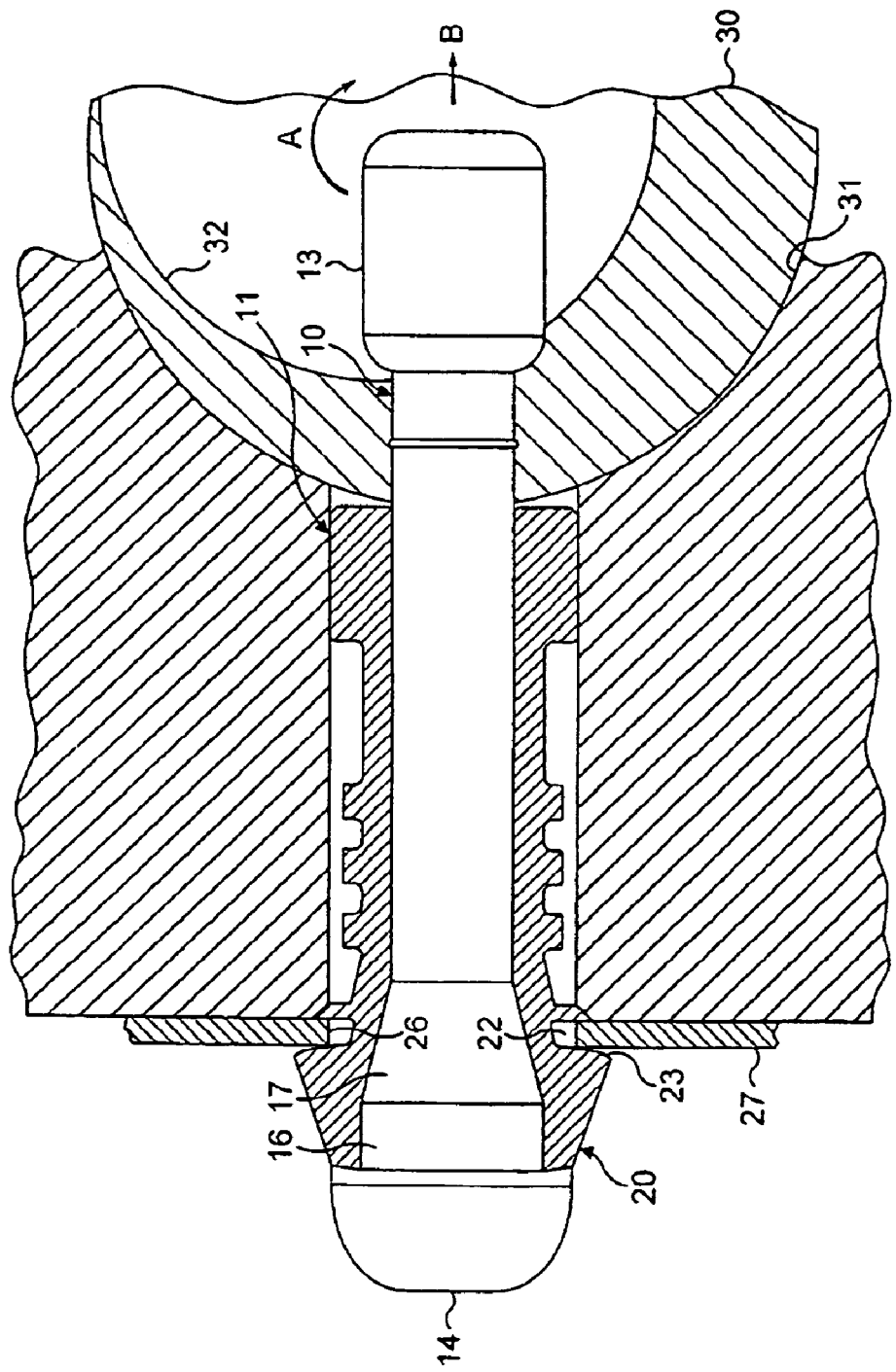

By way of example, an embodiment of the invention will now be described with reference to the accompanying drawings, in which:

FIG. 1 is a sectional view through a fastening device according to the invention, FIG. 2 is a view of the sleeve element of the device, FIGS. 3a and 3b are part sectional illustrations showing the device in use, and FIG. 4 is a detail from FIG. 3b.

The fastening device seen in FIG. 1 is for forming a joint between two members, specifically, for joining a panel to a tube or plate element. The device comprises an elongate dowel element 10 and a sleeve element 11. The dowel element 10 here is in the form of a metal casting, eg using zinc. The sleeve element 11 here is of a resiliently deformable material such as plastics and is conveniently formed directly around the dowel element 10 by a moulding process known as insert moulding. Other materials and methods of manufacture of the dowel and sleeve elements are of course possible.

The dowel element 10 has a central shank 12 which terminates at one end in a head 13. The head 13 is designed to be inserted axially into a hole in one of the members to be joined, and is configured so as to be engagable with a cam drum rotatably mounted in the member, in the known manner of a cam and dowel type of fastener, as seen for example in our earlier patent GB 2285106B.

At its other end, the dowel element 10 terminates in a rounded or mushroom-shaped nose section 14, behind which is an expander region generally indicated by the numeral 15. The expander region 15 comprises a plain cylindrical section 16 immediately adjacent to the nose section 14 and a conically tapering section 17 extending from the plain cylindrical section 16 to the central shank 12. A small annular rib 18 extends around the central shank 12 at a position adjacent to but spaced from the head 13. The rib 18 is designed to act as a positional stop for the sleeve element 11, ie to keep the end of the sleeve element spaced from the head 13 of the dowel element 10 to allow for engagement of the head with a cam drum, in use.

The sleeve element 11 extends generally circumferentially generally around the dowel element 10 and axially between the annular rib 18 and the plain cylindrical section 16. Because it is formed by moulding directly onto the dowel element 10, the inner profile of the sleeve element 11 exactly mirrors the shape of the dowel element. It will be noted in particular that, at its end near the nose section 14 of the dowel element 10, the sleeve element 11 has a conically tapering inner bore 19.

The outer profile of the sleeve element 11 is generally cylindrical. It has an expandable section 20 overlaying the tapering section 17 of the expander region 15 of the dowel element 10. Near to, but spaced from the expandable section 20 is a collar 21. The collar 21 protrudes radially outwardly from the sleeve element 11 and is designed to act as a depth step to ensure the correct amount of insertion when the device is inserted into a hole in the relevant one of the two members to be joined. In between the collar 21 and the expandable section 20, the sleeve element 11 is undercut, ie it has a reduced diameter portion 22. The reduced diameter portion 22 meets the expandable section 20 of the sleeve element at a shoulder 23. At its other end, the sleeve element 11 has a section 24 which is of similar size to the expandable section 20 and this is designed to help locate the device in use in a hole in the other of the two members to be joined. In between these end sections, the sleeve element 11 is generally of lesser outer diameter.

The sleeve element 11 is split along a substantial proportion of its length by virtue of a number of elongate slits 25. Here, the sleeve element 11 has two diametrically opposed elongate slits 25 (one of which can be seen in FIG. 2). These slits extend between the expandable section 20 and the other end section 24 from positions near to but not actually at the ends of the sleeve element 11. The expandable section 20 of the sleeve element 11 is thus effectively in the form of two semi-annular shells joined together at their leading edge. This arrangement facilitates the lateral outward movement of the expandable section 20 of the sleeve element 11, as will be described.

Having described the various features of the sleeve and dowel elements, the mode of operation of the fastening device in a typical application will now be described with reference to FIGS. 3a and 3b.

FIG. 3a shows the position in which the fastening device has been inserted at one end axially into a hole 26 in a thin-walled member 27, which may be a tubular frame element. The device has been inserted up to the collar 21. At the other end, the device has been inserted axially into a hole 28 in a panel 29 in which a cam drum 30 is rotatably mounted in another hole 31. The head 13 of the dowel element 10 is engagable with camming surfaces 32 of the cam drum 30 in known manner, whereby rotation of the drum in the direction of arrow A causes the dowel element 10 to be drawn towards the drum in the direction of arrow B. With the end of the sleeve element 11 abutting against the outside of the drum 30 in known manner, as seen for example in our earlier patent GB 2335245, the dowel element 10 is thus moved longitudinally relative to the sleeve element. This in turn causes lateral outward movement of the expandable section 20 of the sleeve element 11 as it reacts with the expander region 15 of the dowel element 10. The result of this is the "set" condition of the device seen in FIG. 3b and in the detail of FIG. 4.

More specifically, the relative longitudinal movement of the dowel element 10 relative to the sleeve element 11 causes tapered bore 19 of the sleeve element to ride up the tapered section 17 of the dowel element, causing the expandable section 20 of the sleeve element to move radially outwardly as it does so. It will be understood, however, that the amount of lateral outward movement of the expandable section 20 varies along its length. In particular, because the leading end of the expandable section 20 rides over the plain cylindrical section 16 in this movement, and because the slits 25 do not extend the entire length of the sleeve element, the leading end of the expandable section will experience less outward expansion than the remainder of the expandable section. In effect, therefore, due to the configuration of the sleeve element 11 in this area, in particular the arrangement of the slits 25, the outward movement of the expandable section 20 is almost hinge-like, with the most amount of movement being experienced just near the undercut section 22 of the sleeve element.

As will be seen in FIG. 3b and in the detail of FIG. 4, the undercut section 22 has enabled each semi-annular portion of the expandable section 20 of the sleeve element 11 to fold out to the point where the shoulder 23 lodges immediately behind the edge of the hole 26 in the frame member 27. Ideally, the undercut section 22 itself will have moved outwardly so as to be in contact with the edge of the hole 26 in the frame member 27, so as to provide support for the dowel element 10 (although FIGS. 3a and 4 have been drawn with a gap here in the interests of clarity). At this stage, the dowel element 10 will have moved longitudinally relative to the sleeve element 11 to the point where the end of the sleeve element is in abutment with the nose section 14 of the dowel element. In fact, the expandable section 20 of the sleeve element 11 will be in slight compression between the nose section 14 of the dowel element 10 and the frame element 27 in this condition. It will be noted here that the shoulder where the nose section 14 of the dowel element 10 meets the plain cylindrical portion 16 is provided with two angled surfaces 33. These are designed to cooperate with a chamfer 34 on the leading end of the sleeve element 11 to assist in retaining the sleeve element in position on the dowel element.

It will be understood that there has thus been produced by actuation of the device what effectively amount to two semi-annular wedges of plastics material from the expandable section 20 immediately behind the hole 26 in the frame member 27. It has been found in practice that such a device is able to produce a remarkably effective joint with a high resistance to pull-out.

The device is re-usable; the joint can be slackened off simply by rotation of the cam drum 30 in the opposite direction to arrow A to allow the expandable section 20 to return to its normal position, at which point it can be withdrawn from the hole 26 in the frame member 27 and the two members separated.

It is not essential for the hole 26 in the frame member 27 to be "finished off", ie for any burrs caused by drilling to be removed. Although such burrs might cause some local deformation of the sleeve element 11, this is not usually likely to be so much as to render the device not re-usable.

It will be understood that various features of the device may be varied whilst still retaining its essential functionality. For example, as an alternative to the undercut 22 in the sleeve element 11, this can be locally weakened in some other way in order to allow for the necessary movement of the expandable section 20 outwards and behind the edge of the hole 26 in the frame member 27. Also, it may be possible for devices other than the rotatable cam drum 30 shown to be used to tighten the device.

The invention claimed is:

1. A fastening device for joining first and second members together, said fastening device comprising a dowel element which is integrally formed as one piece, said dowel element having a nose section adjacent to a first end of said dowel element, an expander region which is connected to said nose section and extends away from said nose section toward a second end of said dowel element, a head adjacent to the second end of said dowel element, and a shank which extends between said expander region and said head, said expander region of said dowel element includes a tapering section which flares radially and axially outward in a direction away from said shank and toward said nose section, said tapering section having a first cross sectional diameter; as viewed in a plane extending perpendicular to a longitudinal central axis of said dowel element at a location where said tapering section is connected with said shank, said tapering section having a second cross sectional diameter; as viewed in a plane extending perpendicular to the longitudinal central axis of said dowel element at an end of said tapering section which is furthest from said shank, said cross sectional diameter; being greater than said first cross sectional diameter; at least a portion of said nose section of said dowel element has a third cross sectional diameter; as viewed in a plane extending perpendicular to the longitudinal central axis of said dowel element, said third cross sectional diameter; being greater than said second cross sectional diameter; and a sleeve which extends around at least a portion of said dowel element, said dowel element being axially movable relative to said sleeve from an initial position to a retaining position, said sleeve having an end section which extends around said shank of said dowel element and is at least partially disposed in a hole in the first member, said end section of said sleeve has a fourth cross sectional diameter; as viewed in a plane extending perpendicular to a longitudinal central axis of said sleeve, said fourth cross sectional diameter; is larger than said first and second cross sectional diameter; said end section of said sleeve has an outer side surface which engages an inner side surface of the hole in the first member, said end section of said sleeve has an inner side surface which engages an outer side surface of said shank of said dowel element and is slidable along the outer side surface of said shank of said dowel element during movement of said dowel element from the initial position to the retaining position, said sleeve having an expandable section which extends at least part way around said tapering section of said dowel element and is spaced from said nose of said dowel element when said dowel element is in the initial position relative to said sleeve, said expandable section of said sleeve having an inner side surface which is disposed in engagement with an outer side surface of said tapering section of said dowel element when said dowel element is in the initial position relative to said sleeve, said sleeve having a collar which is at least partially disposed between the first and second members when said dowel element is in the initial and retaining positions relative to said sleeve, said collar having a cross sectional diameter; in a plane which extends perpendicular to the longitudinal central axis of said sleeve which is greater than said fourth cross sectional diameter; of said end section of said sleeve, said collar being disposed radially outward of said shank of said dowel element when said dowel element is in the initial position relative said sleeve, said collar being disposed radially outward of said tapering section of said dowel element when said dowel element is in the retaining position relative to said sleeve, said sleeve having an intermediate section which extends between said collar and said end section of said sleeve, said intermediate section of said sleeve having a cross sectional diameter; in a plane which extends perpendicular to the longitudinal central axis of said sleeve which is less than said fourth cross sectional diameter; of said end section of said sleeve, said expandable section of said sleeve being pressed against said nose of said dowel element when said dowel element is in the retaining position relative said sleeve to apply an axial load to said sleeve.

2. A fastening device as set forth in claim 1 wherein said expander region of said dowel element includes a plain section which is connected to an end of said tapering section spaced from said shank.

3. A fastening device as set forth in claim 2 wherein an entire axial length of said plain section of said dowel element has a uniform cross section as viewed in a plane extending perpendicular to the longitudinal central axis of said dowel element equal to said second cross section.

4. A fastening device as set forth in claim 1 wherein said end section of said sleeve is axially spaced a first distance from said head of said dowel element when said dowel element is in the initial position relative to said sleeve, said end section of said sleeve being axially spaced a second distance from said head of said dowel element when said dowel element is in the retaining position relative to said sleeve, said second distance being greater than said first distance.

5. A fastening device as set forth in claim 4 wherein a radially projecting rib is formed on said shank of said dowel element at a location axially spaced from said head of said dowel element, said sleeve having an end surface which is disposed in engagement with said rib when said dowel element is in the initial position relative to said sleeve, said end surface of said sleeve being axially spaced from said rib when said sleeve is in the retaining position relative to said dowel element.

6. A fastening device as set forth in claim 1 wherein said sleeve has an inner side surface which engages an outer side surface of said shank of said dowel element throughout the axial extent of said intermediate section of said sleeve when said dowel element is in the initial position relative to said sleeve.

7. A fastening device as set forth in claim 1 wherein said sleeve includes a connector section which extends between said collar and said expandable section of said sleeve, said connector section of said sleeve being at least partially disposed radially outward of sad shank of said dowel element when said dowel element is in the initial position relative to said sleeve, said tapering section of said dowel element being moved toward said connector section of said sleeve upon movement of said dowel element from the initial position to the retaining position, said connector section of said sleeve being at least partially disposed radially outward of said tapering section of said dowel element when said dowel element is in the retaining position relative to said sleeve, said connector section of said sleeve having a cross sectional diameter; as viewed in a plane extending perpendicular to the longitudinal central axis of said sleeve which is less than the cross sectional diameter; of said intermediate section of said sleeve.

8. A fastening device as set forth in claim 1 further including a slit which extends radially through said sleeve from an outer side surface of said sleeve to an inner side surface of said sleeve, said slit having first and second axial end portions which are disposed in said sleeve at locations spaced from opposite axial end surfaces of said sleeve, said first axial end portion of said slit being disposed in said expandable section of said sleeve, said second axial end portion of said slit being disposed in said end section of said sleeve.

9. A fastening device as set forth in claim 1 further including a shoulder surface formed on said expandable section of said sleeve and facing toward said collar when said dowel element is in the initial position relative to said sleeve, said shoulder surface on said expandable section of said sleeve being disposed in engagement with the second member when said dowel element is in the retaining position relative to said sleeve.

* * * * *